United States Patent
Wu et al.

(10) Patent No.: US 6,861,174 B2
(45) Date of Patent: Mar. 1, 2005

(54) ELECTROCHEMICAL CELL WITH LOW VOLUME COVER ASSEMBLY

(75) Inventors: James X. Wu, North Olmsted, OH (US); Robert E. Ray, Jr., Strongsville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/439,096

(22) Filed: May 15, 2003

(65) Prior Publication Data

US 2004/0157120 A1 Aug. 12, 2004

Related U.S. Application Data

(63) Continuation-in-part of application No. 10/365,197, filed on Feb. 11, 2003.

(51) Int. Cl.[7] .......................... H01M 2/08; H01M 2/12; H01M 4/00
(52) U.S. Cl. .......................... 429/174; 429/53; 429/94; 429/161; 429/175; 429/181; 429/185
(58) Field of Search .................. 429/174, 185, 429/175, 181, 53, 9 A, 161

(56) References Cited

U.S. PATENT DOCUMENTS

| | | | |
|---|---|---|---|
| 1,490,455 A | 4/1924 | Combs | 429/174 |
| 1,836,720 A | 12/1931 | Martus et al. | 429/174 |
| 2,392,795 A | 1/1946 | Anthony et al. | 429/174 |
| 2,396,693 A | 3/1946 | Glover | 429/174 |
| 2,541,931 A | 2/1951 | McEachron et al. | 429/174 |
| 2,552,091 A | 5/1951 | Glover | 429/174 |
| 2,580,664 A | 1/1952 | Drummond | 429/174 |
| 2,837,593 A | 6/1958 | Rueger | 429/174 |
| 3,802,921 A | 4/1974 | Urry | 136/100 |
| 3,802,923 A | 4/1974 | Spanur | 136/178 |
| 3,841,913 A | 10/1974 | Anderson | 136/107 |
| 4,052,537 A | 10/1977 | Mallory | 429/174 |
| 4,469,764 A | 9/1984 | Schumm, Jr. | 429/86 |
| 4,725,515 A | 2/1988 | Jurca | 429/174 |
| 5,567,538 A | 10/1996 | Oltman et al. | 429/27 |
| 5,582,932 A | 12/1996 | Oltman et al. | 429/176 |
| 5,591,541 A | 1/1997 | Oltman | 429/171 |
| 5,662,717 A | 9/1997 | Burns | 29/623.1 |
| 5,846,672 A | 12/1998 | Bennett | 429/164 |
| 5,919,586 A | 7/1999 | Springstead et al. | 429/164 |
| 6,265,096 B1 * | 7/2001 | Tucholski et al. | 429/53 |
| 6,294,283 B1 | 9/2001 | Tucholski et al. | 429/54 |
| 6,368,745 B1 | 4/2002 | Malay | 429/175 |
| 6,461,761 B1 | 10/2002 | Moy et al. | 429/127 |

* cited by examiner

Primary Examiner—Hoa Van Le
(74) Attorney, Agent, or Firm—Russell H. Toye, Jr.

(57) ABSTRACT

An electrochemical battery cell comprising a metal container with an open end closed with a metal cover. The top portion of the container side wall has a torus above an inward necked area, and the cover has a flange shaped around the outside of the torus and extending into the necked area. The inside diameter of the cover flange is smaller than the outside diameter of the torus, so that the cover is locked onto the top of the can. The components sealing the top of the cell require a small volume so that the internal volume for active materials and electrolyte is large. The cell can be closed and sealed with little downward force on the can side wall below the neck, allowing use of a thinner can.

33 Claims, 5 Drawing Sheets

US 6,861,174 B2

ELECTROCHEMICAL CELL WITH LOW VOLUME COVER ASSEMBLY

CROSS-REFERENCE TO RELATED APPLICATIONS

The present application is a continuation-in-part of U.S. patent application Ser. No. 10/365,197, filed Feb. 11, 2003, entitled Battery Cell with Improved Pressure Relief Vent, currently pending. This application is incorporated herein by this reference.

BACKGROUND

This invention is related to an electrochemical battery cell. More particularly, the invention is related to a cell with increased internal volume for active materials and electrolyte and having improved discharge capacity.

Increasing the discharge capacity of electrochemical cells has been an ongoing objective of manufacturers of electrochemical cells and batteries. There are often certain maximum external dimensions that place constraints on the volume of a given type of cell or battery. These maximum dimensions may be imposed through industry standards or by the amount of space available into which the cells or batteries can be put. These dimensions limit maximum cell and battery volumes. Only a portion of the volume is available for the materials (electrochemically active materials and electrolyte) necessary for the electrochemical discharge reactions, because other essential, but inert, components (e.g., containers, seals, terminals, current collectors, and separators) also take up volume. A certain amount of void volume may also be necessary inside the cells to accommodate reaction products and increases in material volumes due to other factors, such as high temperature. To maximize discharge capacity in a cell or battery with a limited volume, it is desirable to minimize the volumes of inert components and maximize the volume available for active materials and electrolyte.

Dimensions of consumer cylindrical alkaline batteries are specified in an international standard (International Electrical Commission (IEC) Publication 60086-2, dated July 2000). Such cells have a positive electrode containing manganese dioxide, a negative electrode containing zinc, and an alkaline aqueous electrolyte typically containing potassium hydroxide. They often have a cylindrical steel can that serves as the cell container, with the positive electrode (cathode) formed in a hollow cylindrical shape against the interior surface of the can. A gelled negative electrode (anode) is centrally disposed within the cylindrical cavity in the cathode. An ion-permeable, electrically insulating separator is placed between the anode and adjacent surfaces of both the cathode and the bottom of the can. Electrolyte solution is contained within both the anode and the cathode. The can, which is in direct contact with the cathode, serves as the cathode current collector. The open top portion of the can is closed with a closing element, typically including an annular polymeric seal. An outer cover is generally placed over the seal to serve as a negative terminal for the cell. In addition to closing the can, the seal also electrically insulates the negative terminal from the can. An anode current collector, usually in the form of a brass nail or wire, extends through an aperture in the center of the seal and into the anode within the cell. The end of the anode current collector on the outside of the can makes electrical contact with the negative terminal. The bottom of the can may be flat, or it may be formed to have a central protruding nubbin that serves as the positive terminal of the cell. If the can bottom is flat, a separate metal cover is normally affixed to the can bottom as the positive terminal. A jacket, often an electrically insulating, adhesive film label, is generally placed around the side walls of the can. Cells may include additional features. For example, an inner cover or a bushing may be disposed between the seal and the negative terminal to provide a rigid member for maintaining a compressive seal between the seal and the surface of the can and/or anode current collector. In such cells the seal also typically contains a pressure relief vent. This feature usually includes a thinned area, which is designed to rupture when the internal pressure goes above a predetermined level. Examples of cells with seal designs of this type can be found in U.S. Pat. Nos. 5,227,261 and 6,312,850. However, this type of seal requires a relatively large amount of volume in order for the pressure relief vent to function as intended.

One approach that has been taken to increase the amount of active materials and electrolyte in cells is to reduce the volume taken up by the components that close and seal the open end of the cell container, thereby making it possible to increase the heights of the electrodes. Examples of this approach can be found in U.S. Pat. Nos. 6,294,283 and 6,410,186. In some cells the components sealing the open end of the container include a pressure relief vent. Electrochemical cells are capable of generating gas, during storage, during normal operation, and, especially, under common abusive conditions, such as forced deep discharging and, for primary cells, charging. Cells are designed to release internal pressure in a controlled manner. A common approach is to provide a pressure relief mechanism, or vent, which releases gases from the cell when the internal pressure exceeds a predetermined level. Pressure relief vents often take up additional internal volume because clearance is generally needed between the vent and other cell or battery components in order to insure proper mechanical operation of the mechanism. In cells that include a pressure relief vent in the top of the container, the volume of inert components can be reduced by modifying the vent to require less volume or by relocating the vent to another part of the cell so a more volume-efficient vent design can be used. For example, U.S. Pat. No. 6,348,281 discloses a cell with a low-volume pressure relief vent in a metal cover in the open end of the cell container. In co-pending U.S. patent application Ser. No. 10/365,197, the pressure relief vent is located in the bottom of the cell container, and the space required for the vent to open is provided between the bottom of the container and a protruding contact terminal located over the vent. Another example of a cell with a pressure relief vent in the bottom of the cell container can be found in U.S. Pat. No. 6,346,342.

Another approach that has been used to increase the cell volume available for active materials and electrolyte is to reduce the thickness of the cell and container wall thicknesses. This may require the use of stronger materials that are better able to withstand forces applied during cell manufacture and by pressure that builds up inside the cell, or it may also require changes in the cell design or manufacturing process to reduce the forces applied to the cell walls. Examples of this general approach can be found in U.S. Pat. Nos. 5,846,672, 6,368,745, and 5,567,538.

Yet another approach that has been used in the past is to use a can made of one of the active materials of the cell as the container, as found in many carbon/zinc cells, both LeClanche and zinc chloride, and in magnesium cells. Examples of these types of cells can be found in U.S. Pat. Nos. 2,580,664, 2,541,931, 2,392,795, 4,469,764, 3,841,913, 3,802,923 and 3,802,921.

However, prior attempts to increase the amount of active materials and electrolyte in the cell have not been completely successful. Further increases in the amount of active ingredients are still desirable, and the results of prior attempts have suffered from one or more of the following disadvantages: new manufacturing equipment required, expensive modifications to existing equipment and processes required, expensive cell component materials, large number or complexity of cell components, electrical short circuits between cell components, opening of cell sealing components at low internal cell pressure, cell leakage, short cell shelf life, poor seal tolerance of high temperature and high axial forces on cell during assembly.

For the foregoing reasons there is a need for an electrochemical battery cell with a large internal volume for active materials and electrolyte that provides a-large discharge capacity without increasing the total volume of the cell.

There is also a need for an electrochemical battery cell in which the sum of the inert ingredients is reduced without adversely affecting resistance to internal pressure, leakage, shelf life, tolerance of high temperature environments and resistance to electrical short circuits.

There is also a need for an increased capacity battery cell that can be economically manufactured with a small capital investment.

SUMMARY

The present invention is directed to an electrochemical battery cell that has large quantities of active materials and electrolyte and a large discharge capacity. The cell comprises a metal container with a closed bottom, an upstanding side wall and an initially open top with a terminal edge. Within the container are a positive electrode, a negative electrode, a separator and an electrolyte. Each of the positive and negative electrodes has a current collector. The cell has a metal cover, having a peripheral flange with a terminal edge, disposed across the open top of the container for sealing the electrodes, separator, and electrolyte within the cell. The metal container is electrochemically nonactive, and one of the electrodes is in direct contact with an inner surface of the container side wall such that the side wall is at least a part of the current collector of the electrode with which it is in direct contact. The side wall is shaped inward below an uppermost part of the container to form a neck, such that a neck outer surface width is smaller than a container outer surface width above the neck. The cover flange is shaped around the outside of the side wall above the neck, with the width of the terminal edge of the cover flange smaller than the width of the side wall above the neck. This forms a sealing interface between the cover flange and the side wall above the neck, without the cover flange being disposed between adjacent layers of the can side wall.

In one embodiment the terminal edge of the container is shaped radially outward; in another embodiment it is shaped radially inward.

In yet another embodiment the positive electrode is in direct contact with an inner surface of the container side wall.

In yet another embodiment the cell has a cylindrical radial cross section, and the maximum container width is less than the cell height. The positive electrode comprises manganese dioxide, the negative electrode comprises zinc and the electrolyte comprises an aqueous alkaline solution. The positive electrode is in direct contact with an inner surface of the container side wall, so the side wall is at least part of the positive electrode current collector, and the negative electrode is disposed within a cavity in the positive electrode.

An electrochemical battery cell according to the present invention has a number of advantages. It has a large internal volume for containing active electrode materials and electrolyte, resulting in high discharge capacity. This large internal volume is possible in part because the initially open end of the container is closed and sealed with components that take up a small amount of the cell's total volume.

The components closing and sealing the open end of the cell extend into the cell only a short distance from the top of the container, so the heights of the electrodes can be high relative to the total height of the cell. This provides a large electrode interfacial surface area and large contact surfaces between the electrodes and their current collectors, which is advantageous on high current and high power cell discharge.

The cell design can accommodate placement of the cell's pressure relief vent in either bottom of the container or the cover where doing so can further reduce the volume of the components closing and sealing the cell.

The shape of the top portion of the container side wall adds strength so the thickness of the container can be minimized, further increasing the volume for electrodes and electrolyte, or so less expensive materials may be used for the container.

The designs of the container and the components used to seal and close the cell are not complex, so they can be easily made. They can also be easily reshaped during cell manufacturing, using well-known processes and relatively simple tooling. Both the component designs and the closing processes are readily adaptable to common cell manufacturing processes and equipment, minimizing conversion costs and time. The cell can be closed and sealed using processes that apply little downward force on the container side wall, so that less side wall strength is required. This can allow the use of thinner materials for the container or allow the use of materials that are not as strong.

The battery cell of the invention has a strong seal, capable of withstanding high internal pressures that may result when the cell is abused. The cell seal is also highly reliable, providing good cell leakage and shelf performance characteristics, under not only normal conditions of storage and use, but under extreme environmental and electrical conditions as well, without relying on a jacket and separate external covers for a good seal.

BRIEF DESCRIPTION OF THE DRAWINGS

The above and other features, advantages and objects of the present invention will be further understood and appreciated by those skilled in the art by reference to the following specification, claims and accompanying drawings, where:

DESCRIPTION

Figure 1:
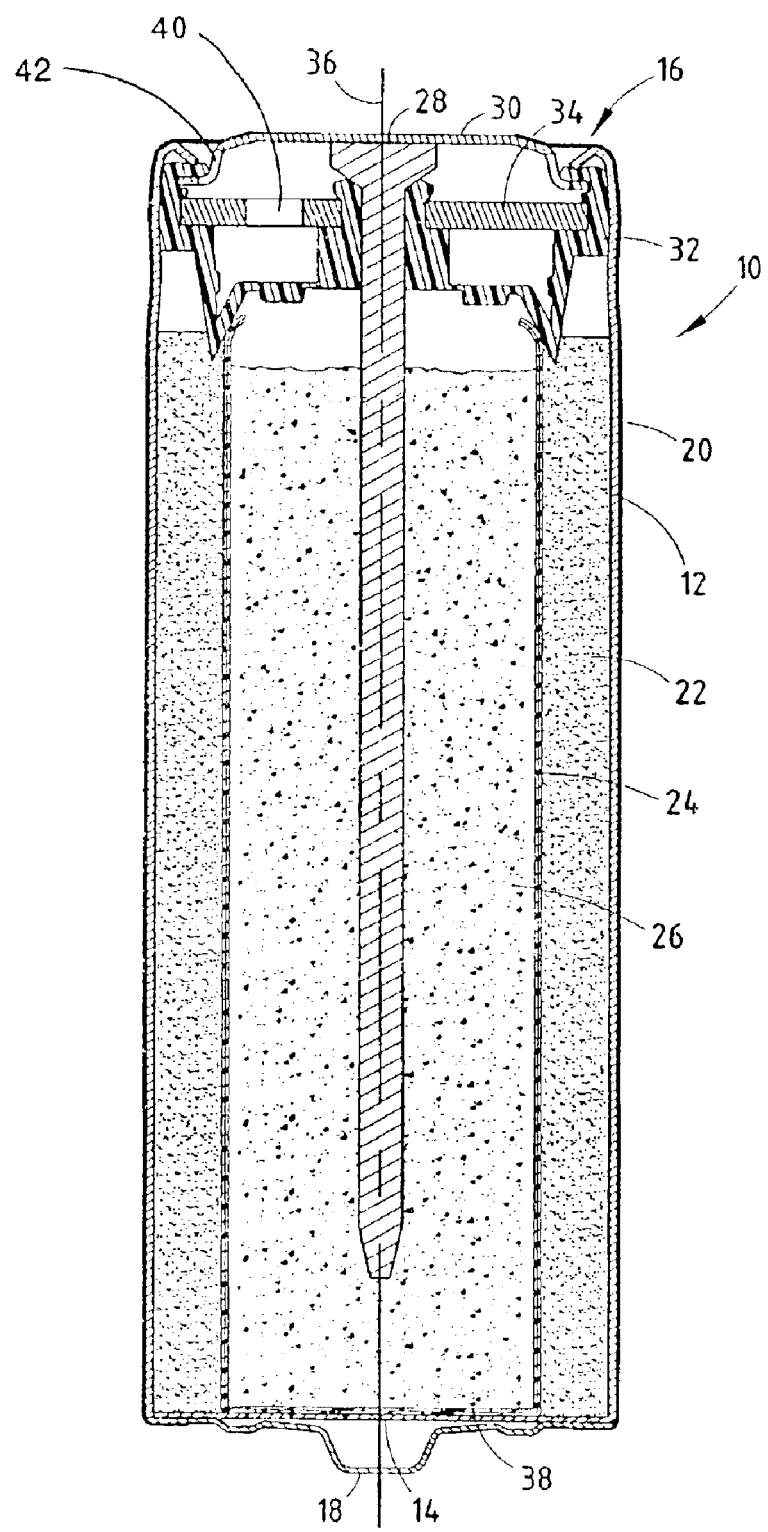
FIG. 1 shows a cross sectional view of a conventional electrochemical battery cell.

Unless otherwise defined herein, the following terms will have the meanings and relationships shown:

bottom, top, vertical, horizontal, upward, downward, etc.—positions and orientations relative to the cell and container when in the orientation shown in FIG. 1;

crimp release pressure—the internal cell pressure at which at least one of the can and cover of the cell deforms to release pressure at a can or cover sealing interface rather than through a separate pressure relief vent;

inner, inward—in a direction away from the exterior surface of the cell;

outer, outward—on or toward the exterior surface of the cell;

alkaline cell—a cell having an electrolyte with a pH greater than 7.0 and comprising an electrolyte salt dissolved in water;

electrochemically nonactive material—a material that is not an active electrode material of the electrochemical cell;

open end of cell container—an end of the container that is open during the early stages of cell manufacturing, so that cell components and materials can be inserted;

neck—an area of the container where the entire side wall is shaped inward, toward the longitudinal axis of the cell, to form a narrow container width relative to the container width both above and below the neck (an annular groove in the outer surface of a can side wall, where there is no change in container width at the inner surface adjacent to the groove, is not considered a neck, nor is a reduced diameter rim whose terminal edge does not have a diameter greater than that portion of the rim below it);

primary cell or battery—a cell or battery that is not intended to be recharged by the user;

radially—in a direction perpendicular to a longitudinal (vertical in FIG. 1) axis of the cell;

sealing interface—those portions of adjacent surfaces of cell components that cooperate to form a seal between those components;

shoulder—a portion of a container (can) side wall at which there is a transition from the larger diameter or width of the container to the smaller diameter or width of the neck;

side-by-side—having adjacent major surfaces; and width (container, cell)—a dimension perpendicular to a longitudinal axis of the container or cell.

The present invention provides an electrochemical battery cell with an excellent seal between the cell's metal container and the metal cover closing the open end of the container. The cover is placed over the outside of the top part of the container. The side wall of the can is necked inward near the top of the cell to form a torus that protrudes radially outward above the neck. The flange of the cover is formed around the torus, with the edge of the cover bent inward, toward the neck in the container. The diameter of the edge of the cover is smaller than the outside diameter of the torus, thereby locking the cover onto the top of the container. In this way, the cover cannot come off the cell unless the edge of the cover is deformed outward.

The present invention will be better understood by comparison with a conventional cell, such as the cell shown in FIG. 1. Cell 10 is an example of a cylindrical primary alkaline zinc/manganese dioxide cell having a bobbin-style electrode configuration. The exterior of the cell includes a metal can 12 with an integral closed bottom end 14, an initially open top end 16, with a side wall extending between the bottom and top ends 14 and 16. An electrically conductive metal positive contact terminal cover 18 is affixed to the can bottom 14. The positive contact terminal 18 has a central outward protruding nubbin so that the positive terminal size and shape meets the requirements for the positive terminal of a cylindrical alkaline zinc/manganese dioxide cell, as defined by IEC Publication 60086-2.

Inside the cell a positive electrode 22 with a hollow cylindrical shape is formed against the inner surface of the side wall of the can 12, creating a cylindrical cavity within the positive electrode 22. With the positive electrode 22 in direct contact with the inner surface of the can wall, the metal can functions not only as the cell container, but as the positive electrode current collector as well. This provides a current collector with a large contact surface area without adding a separate component to the cell 10. Two layers of electrically insulating, ionically conducting material are formed into a hollow tube, the bottom edge of which is folded inward to create a separator basket 24 with a cylindrical side wall 36 and a closed bottom 38. The separator 24 is inserted into the cavity in the positive electrode 22 to separate the negative electrode 26 from both the positive electrode 22 and the inside surface of the can bottom 14. The negative electrode 26 is dispensed into the area within the separator 24.

A cover and seal assembly is placed in the open end 16 of the can 10 to close the cell 10 and seal the contents inside the cell 10. This assembly includes an elastomeric seal 32, an inner cover 34, a negative electrode current collector 28, which extends into the negative electrode 26, and an electrically conductive metal negative contact terminal cover 30. The seal 32 has a pressure relief vent for preventing the pressure within the cell from getting too high. The seal 32 has one or more thin spots that will break open when the internal pressure reaches a predetermined level, to release pressure from the cell 10. One or more holes 40 are provided in the inner cover 34, and one or more holes 42 are provided in the negative contact terminal cover 30 to allow the cell to vent to the outside. The negative electrode current collector 28 extends through an aperture in the center of the inner cover 34 and is affixed to the inside of the negative contact terminal cover 30. The seal 32 extends inward to form a hub around the current collector 28. The hub of the elastomeric seal 32 is compressed between the current collector 28 and the edge of the aperture in the inner cover 34 to form a tight seal between the inner cover 34 and negative current collector 28. In some conventional cells, a separate bushing or ring is place around the hub of the seal 32 to provide a good seal around the current collector 28.

Another feature of the seal 32 is that it prevents anode material from contacting the lower surface of the inner cover and a portion of the upper end of the anode current collector, thereby reducing gas generation from wasteful corrosion reactions.

The top edge of the separator 24 also makes contact with the seal 32 to close off the top of the negative electrode compartment. This prevents material from either the positive electrode 22 or the negative electrode 26 from moving to a location in the cell where it could make electrical contact with the other electrode.

A jacket 20 is put around the exterior of the side wall of the cell 10, extending over the peripheral portions of both terminal covers 18 and 30.

The can in cell 10 is initially open, so the electrodes and separator can be inserted into the cell. The top of the can, above the electrodes, initially has a larger inside diameter than the body of the can. When the cover and seal assembly is inserted into the top of the cell, the smaller diameter can body will support the assembly and keep it from slipping too far into the can. There is often a pronounced shoulder at the transition from the larger diameter top of the can to the smaller diameter can body to provide adequate support for the cover and seal assembly during the cell closing. In some cells, an inward annular bead may be formed in the can just below the seal to provide support. In the closing process, the diameter of the top part of the can is reduced, compressing the vertical wall of the elastomeric seal between the can side wall and the adjacent edge of the inner cover to create a radial seal. The top edge of the can is also crimped inward and downward to hold the cover and seal assembly in the cell and create an axial seal among the seal, inner cover and negative terminal cover. This requires the application of axial force during closing. There must be adequate support for the cover and seal assembly as well as sufficient strength in the seal and the side and bottom of the can to withstand this axial force.

Figure 2:
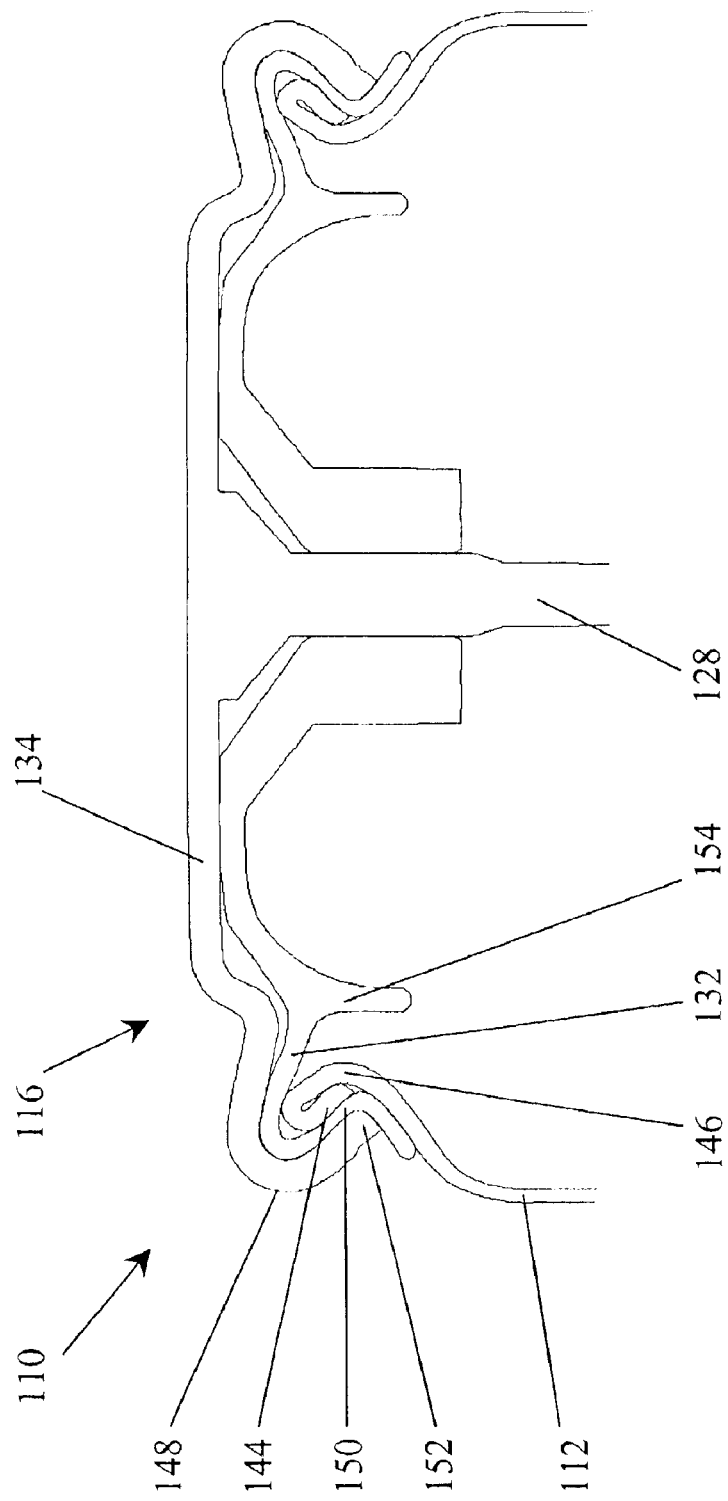
FIG. 2 shows a partial cross sectional view first embodiment of an electrochemical battery cell according to the invention.

A housing for a cell according to a first embodiment of the invention is shown in FIG. 2, which is a partial cross sectional view of half of the top portion of the cell 110. The electrodes and separator are not shown. Cell 110 is a cylindrical alkaline zinc/manganese dioxide cell similar to cell 10. The electrodes are similar in form and composition, as are other features of the cell. Features of cell 110 that have corresponding features in cell 10 are identified with reference numerals that are the same as the corresponding features in FIG. 1, except for the addition of a "1" to the beginning of each.

In cell 110, the volume required for a pressure relief vent and its operation is reduced compared to cell 10. The pressure relief vent in cell 110 is located in the bottom of the can 112. The pressure relief vent has two reduced thickness arcs, disposed on a single interrupted annular ring. Each arc is a groove formed in the outer surface of the can bottom, and the ends of the opposing arcs are spaced apart from each other by unthinned sections of the can bottom. When the internal cell pressure reaches a predetermined level, the can bottom breaks open along one or both of the grooves. A portion of the can bottom swings outward, into the space between the remainder of the can bottom and the outward projection in the positive terminal, to create a vent opening. The unthinned sections between the grooves are of sufficient width so the portion of the can bottom within the annular ring defined by the arcs does not separate from the rest of the can bottom. Because the pressure relief vent opens into the open space between the can bottom and the central positive terminal projection, very little space is required for the pressure relief vent. Other pressure relief vent designs can also be used in the cell 110, including pressure relief vents formed in the cover 134 and pressure relief vents at the interface between the anode current collector 128 and the gasket 132. The latter type of pressure relief vent is disclosed in U.S. patent application Ser. No. 10/034,687, entitled Electrochemical Cell having Venting Current Collector and Seal Assembly, filed on Dec. 20, 2001, which is hereby incorporated by reference.

Both the number of components in the cover and seal assembly of cell 110 and the volume they require are reduced compared to conventional cell 10. In cell 110 the terminal edge of the side wall of the can 112 is folded over to create a rim 144 having two side-by-side layers of the can wall. The can 112 is shaped inward to form an annular ring, or neck 146, smaller in diameter than portions of the can 112 both above and below the neck 146. The area above the neck 146 is in the shape of a torus 148. A cover 134 is placed over the top of the open end 116 of the can 112, rather than inside the opening as in cell 10. A gasket 132, similar to the seal 32 in cell 10, is also placed over the open end 116 of the can 112, with the peripheral rim 150 of the gasket 132 between the cover flange 152 and the torus 148. The cover flange 152 is shaped inward to compress the gasket rim 150 between the cover flange 152 and the can torus 148, thereby creating a sealing interface between the cover flange 152 and the can torus 148. The two-layer can rim 144 provides a rounded surface against which the gasket rim 150 can be compressed, with reduced risk of damage to the gasket 132 than if the can rim 144 was a single layer of the can wall. The two-layer rim 144 also provides increased hoop strength to the torus 148, to prevent the torus 148 from deforming inward, thereby better maintaining compression of the gasket rim 150. The shape of the can neck 146 also contributes to the hoop strength of the top part of the can.

Because the gasket 132 does not include a pressure relief vent, it does not have to extend as far into the inside of the cell as the seal 32 in cell 10. Since the can-cover sealing interface is located on the outer surface of the can 112, and it alone adequately seals the cell, a separate inner cover is not required to maintain adequate compression of the gasket 132 between the can 112 and cover 134. Likewise, a separate cover or bushing is not required around central hub of the gasket 132 to prevent leakage to the outside of the cell between the gasket 134 and the negative current collector 128. The gasket 132 can closely conform to the inner surface of the cover 134 and the uppermost part of the current collector 128 to prevent gas generation at those surfaces. There is a small downward extension 154 from the gasket 132 adjacent to the can neck 146 to cooperate with the top edge of the separator to prevent electrical contact of active material from either electrode with the opposite electrode.

In cell 110, a single cover 134 can replace the inner cover 34 and the negative terminal cover 30 in cell 10, thus eliminating at least one cell component, and at least two compared to a cell also including a separate bushing around the central hub of gasket 32.

The can 112 may be made by any suitable method, such as by drawing from a sheet of metal. Initially the can 112 may have a straight side wall, the top portion of which is subsequently formed to the desired shape using any suitable method. The order in which the rim 144, torus 148 and neck 146 are formed can be varied. When the top portion of the can 112 is formed after the cathode is inserted, cathode insertion and molding is facilitated, especially when the cathode molding is a ring molding process. Alternatively, part of the can forming may be done before cathode insertion and the remainder done after cathode insertion and molding is completed. When the top portion of the can 112 is shaped after cathode insertion and molding, care should be taken not to damage the cathode or disturb the can-cathode interface.

The cover 134 and gasket 132 can be made with the flange 152 and rim 150, respectively, extending horizontally, or they may be made with the flange 152 and rim 150 extending at least partially downward. The latter will reduce the amount of shaping that is necessary after the gasket 132 and cover 134 are placed over the open end 116 of the cell 110. The dimensions of the cover 134, the gasket 132 and the shaped top portion of the can 112 are selected so that these components can be easily assembled together to close the open end 116 of the cell 110 after the electrodes, separator and electrolyte are in the cell 110. By appropriately sizing the cover 134, gasket 132 and can 112, the maximum diameter of the cover 134 of the finished cell 110 can be controlled to no greater than the diameter of the remainder of the cell. By doing so the can diameter below the neck 146 (and the internal cell volume) can be maximized while staying within IEC limits, wrinkles can be avoided with adhesive label type jackets and cell handling can be facilitated, e.g., during parts of the manufacturing process where it may be desirable to transport the cells by rolling them. Damage to the gasket during and after sealing the cell can be avoided by making the edge of the cover flange 152 with a chamfered or rounded inside corner.

Cell 110 can be sealed by applying a radial force to the cover flange 152 and gasket rim 150, displacing both inward, under the torus 148 formed by the can rim 144, and compressing the gasket rim 150. The cover flange 152 and gasket rim 150 can be displaced upward, and the somewhat horizontal portion of the cover 134 above the can rim 144 can be displaced downward, to further compress the gasket rim 150 and to achieve compression in a greater portion of the gasket rim 150. This can provide large sealing surfaces between the gasket rim 150 and both the cover flange 152 and the can rim 144, as well as provide sufficient gasket compression to insure a good seal over a long period of time, even under extreme environmental and cell use conditions. This method of sealing the cell 110 can be accomplished with little downward force being applied to the can 112 below the neck 146.

Variations of cell 110 are possible. For example, if the can material is sufficiently strong, the rim 144 can be a single layer of the top portion of the can 112, rather than being folded over into a two-layer rim. The amount of material folded over to form the can rim 144 can also be more or less than shown in FIG. 2. The fold does not have to be a sharp fold as shown, but may be more rounded, and the edge of the can 112 does not have to be in contact with the can side wall. The cover flange 152 can be longer or shorter than shown in FIG. 2, but the gasket rim 150 must be long enough to prevent electrical contact between the edge of the cover 134 and any portion of the can 112. The cover flange 152 can be flared outward slightly to conform with the lower portion of the neck 146 and keep the edge of the cover 134 from cutting through the gasket rim 150 and contacting the can 112. The degree of outward bending of can rim 150 to form the torus 148 can also be varied. Instead of being folded to the outside, the edge of the can may be folded to the inside as long as the torus 148 formed is sufficient for securing the cover 134 to the can 112. The shape of the cover 134 above the can rim 144, as well as the type and shape of the anode current collector 128 and the manner in which the collector 128 is electrically connected to the cover 134, can be modified as well. Instead of a gasket 132 that is a separate component, a coating on the inner surface of the cover 134 can be used to provide a seal between the can 112 and cover 134. The cell can also be designed so that the seal between the can 112 and cover 134 will be partially broken to release internal pressure, thereby serving as a pressure relief vent for the cell. Other modifications of the cover 134, gasket 132, can 112 and negative current collector 128 are also possible. Such modifications can include, but are not limited to, changes in materials, shapes and dimensions.

Figure 3:
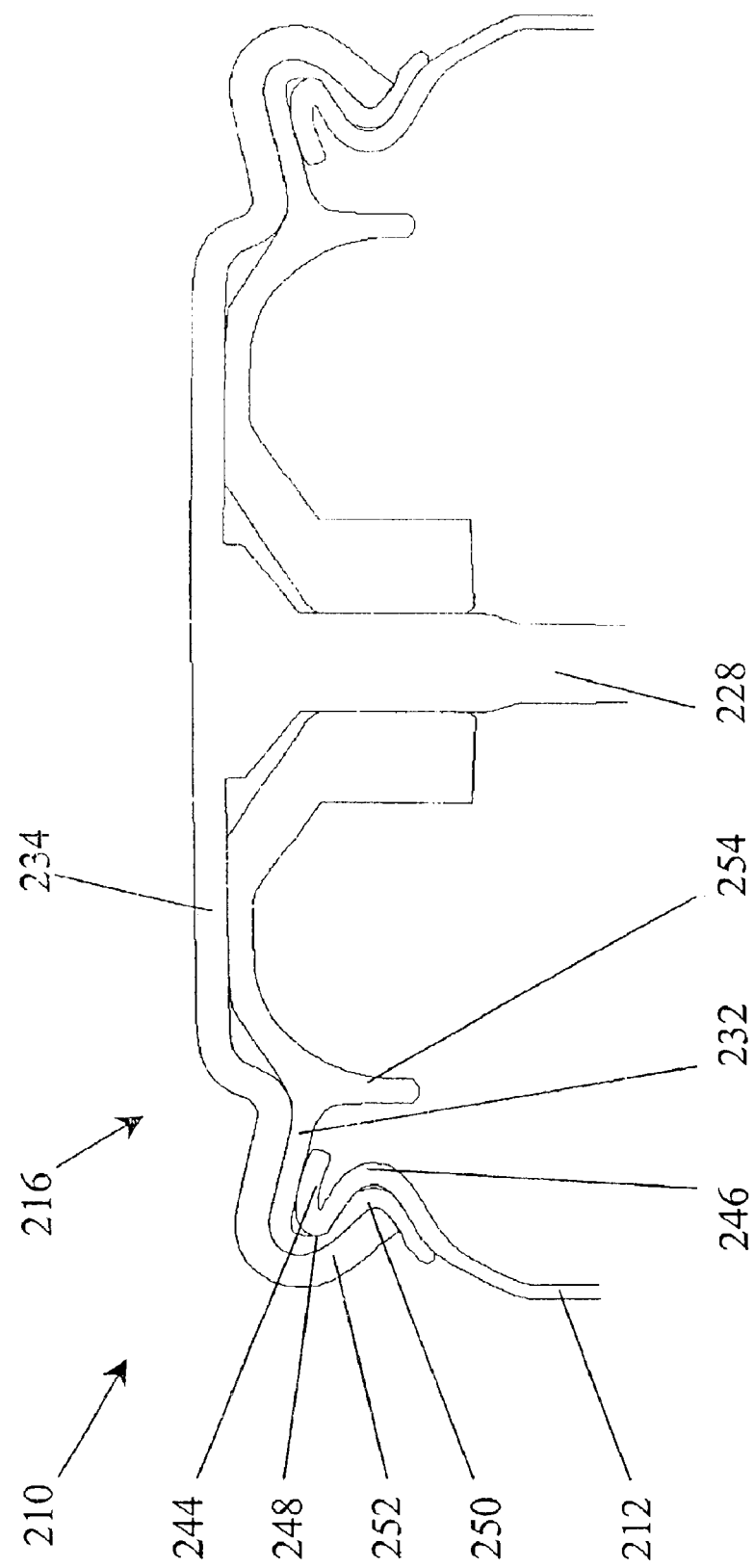
FIG. 3 shows a partial cross sectional view of a second embodiment of an electrochemical battery cell according to the invention.

A portion of a housing of another embodiment of the battery cell of the invention is shown in FIG. 3, which is a partial cross sectional view of cell 210, not including the electrodes or separator. Cell 210 is a cylindrical alkaline zinc/manganese dioxide cell similar to cells 10 and 110. Features of cell 210 that have corresponding features in cell 10 are identified with reference numerals that are the same as the corresponding features in FIG. 1, except for the addition of a "2" to the beginning of each. Features of cell 210 that have corresponding features in cell 110 are identified with reference numerals that are the same as the corresponding features in FIG. 2, except that the "1" at the beginning of each is replaced with a "2".

In cell 210 the can rim 244 is folded to the inside of the can 212, rather than to the outside as in cell 110. Cell 210 can be sealed in a manner similar to that described above, and as described above for cell 110, variations of cell 212 are also possible.

To facilitate insertion and forming of the cathodes in the cans in cells 110 and 210, the open end of the can may be necked after the electrodes, separator and electrolyte are inside the cell. In fact, the top of the can may have a slightly larger inside diameter than the body of the can, in which the electrodes are disposed. However, this does not preclude some preparation of the top of the can prior to adding the active materials to the cell. For example, it may be desirable to fold the top of can 112 in FIG. 2 as part of the can manufacturing process, in order to achieve high quality in the folding operation without damaging the electrodes or separator. The can may then be necked to the desired shape as part of the cell assembly process. In the embodiment shown in FIG. 3, there is no sharp fold in the top of the can side wall, so all of the reforming of the top of the can side wall can be done during cell assembly.

Any suitable metal forming techniques can be used to neck the cans and seal the cells. For example, cans for the embodiment of the invention shown in FIG. 2 may be necked using a two-step crimping and beading process. In the first step, the top portion of the can is reduced in diameter, and in the second step a bead is formed just below the fold, simultaneously bending the folded portion of the can to the desired angle. During the beading, the cans may be pushed upward against a stop so the can wall is not stretched, thus preventing thinning of the metal. This will result in shortening of the can during necking. The beading can be done by pushing the can inward with the edge of one or more wheels that are rotated around the can. The edge of the wheel can also have an angled top surface, so that as the can is beaded the folded portion of the can is bent downward and the outer layer of the fold conforms to the angled surface of the beading wheel. A similar crimping and beading process may be used to neck cans for use in the embodiment shown in FIG. 3.

Colleting is an example of a suitable type of process for sealing the top of the cell. After the can is necked to the desired shape and the gasket and cover placed over the open end of the cell, a collet is used to reduce the diameters of the cover flange and gasket rim. This may be done in one or more steps. To control the final dimensions of the top of the closed cell, the can may be forced upward and held against a stop on the inside of the collet, as the collet deforms the cover flange and gasket rim into the necked area of the can. This locks the cover flange in place below the torus formed by the folded portion of the can. The cover is deformed inward to compress the gasket between the cover and the necked portion of the can and form a seal. The primary area of gasket compression may be in the beaded area of the can, but some axial compression of the gasket may also be produced by pinching the gasket between the can and cover on both sides of the can fold.

There are design considerations that can be important in embodiments of the invention. For example, the cell cover must remain secured to the top of the cell when the internal cell pressure is below a predetermined point. This predetermined pressure is normally well above the pressure at which the pressure relief vent will open. This is achieved by a combination of factors, including sufficient can torus strength, sufficient cover flange strength and a cover flange edge width (inside diameter) smaller than the can torus width (outside diameter). The composition, physical characteristics and dimensions of the cover, can and gasket will influence these factors. Suitable combinations can be determined empirically or through computer modeling. Computer modeling software using finite element analysis, such as ABAQUS (from Hibbit, Karlsson & Sorensen, Inc., Pawtucket, R.I., USA) and MARC K 7.3 (from MSC.Software, Los Angeles, Calif., USA), can be a useful tool for designing pressure relief vents; it can take such factors into account.

Figure 4:
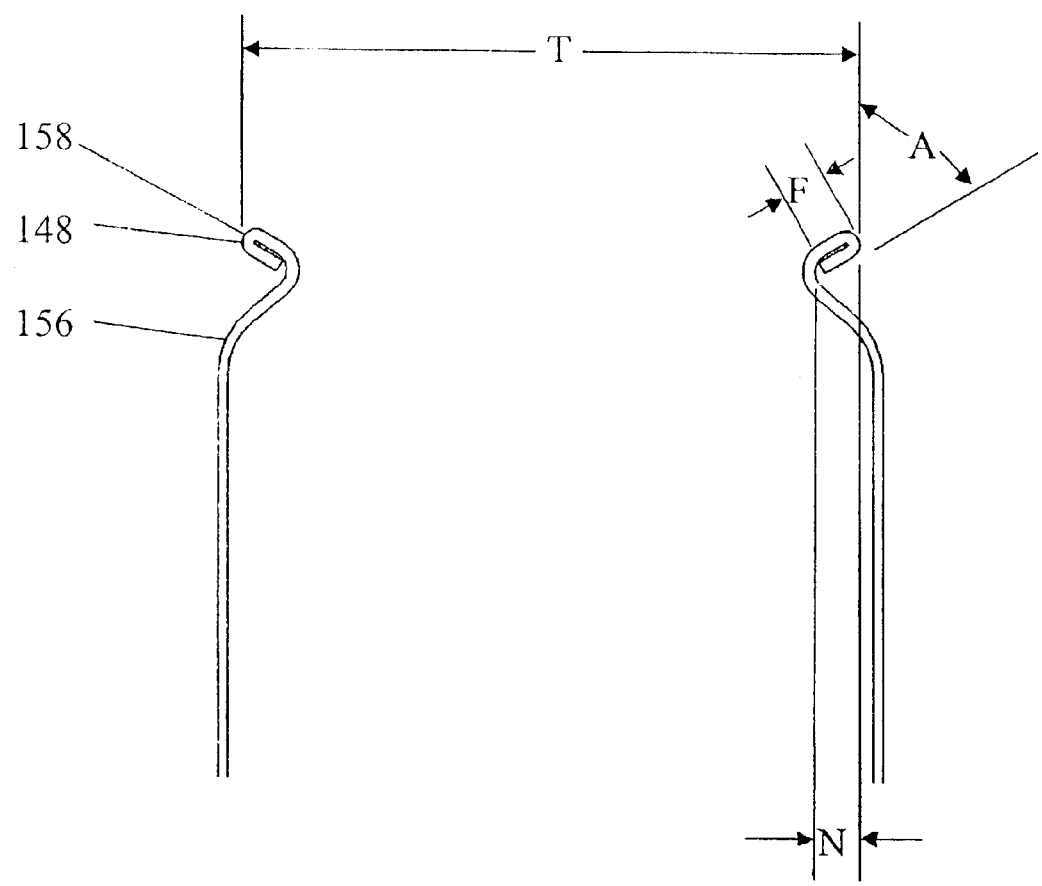
FIG. 4 shows a partial cross section of the top portion of a can for use in an electrochemical battery cell according to the invention.
Figure 5:
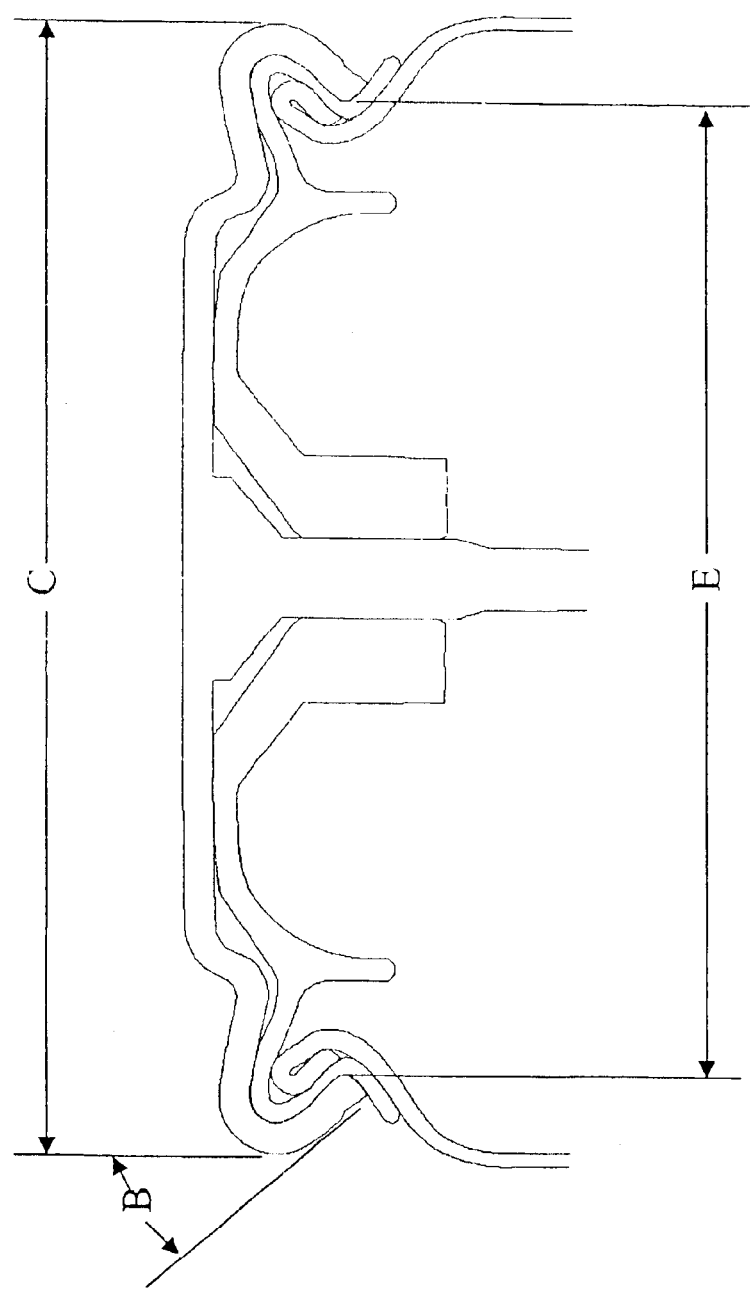
FIG. 5 shows a partial cross section of the top portion of the sealed housing of an electrochemical cell according to the invention.

In the LR6 cell housings described above, a number of dimensions can be important. Reference is made to FIGS. 4 and 5, which are show the top portion of a necked can suitable for use in the cell housing shown in FIG. 3 and the top portion of a sealed cell according to the same embodiment.

As shown in FIG. 4, the can side wall is necked inward above the shoulder 156 and the can fold is bent to form a torus 148 above the smallest diameter of the neck. Dimensions that can affect the crimp release pressure of the cell include the torus diameter T, fold length F, fold angle A, neck depth N and the radius of the end of the fold R. To increase the crimp release pressure, one or more of the torus diameter, neck depth, fold length and fold angle can be increased. The radius of the end of the fold can also be increased to provide an enlarged fold thickness near the end of the fold.

As shown in FIG. 5, the periphery of both the cover and the gasket are deformed inward. Important dimensions include the final cover diameter C, cover edge inside diameter E and cover flange angle B. If the colleted cover diameter is slightly smaller than the diameter of the can below the shoulder, the internal cell volume can be maximized. To increase the crimp release pressure of the cell the cover edge inside diameter can be reduced and the cover flange angle can be increased. The proximity of the cover to the can at the sealing interfaces will determine amount of compression of the gasket. In general a good seal will be achieved when the gasket is compressed by at least 10 percent of its thickness, though this can vary depending on the gasket material. Over-compressing should be avoided to prevent damage to the gasket.

The embodiments of the invention illustrated in FIGS. 2 and 3 are LR6 type cylindrical alkaline $Zn/MnO_2$ cells. The invention may also be adapted to other cell sizes, shapes (including prismatic cells) and electrode configurations (including flat and spiral wound), and to cells with other active materials and electrolytes. Examples of other cell types with which the invention can be used include: other primary alkaline cells, rechargeable alkaline cells (e.g., nickel/cadmium and nickel/metal hydride), primary nonaqueous cells (e.g., lithium/iron disulfide and lithium manganese dioxide), and secondary nonaqueous cells (e.g., lithium/iron disulfide, lithium manganese dioxide and lithium ion). The type of cell, including specific electrode and electrolyte formulations, can be selected to best meet the requirements of the intended ultimate use of the battery cell.

As for any electrochemical cell, materials selected for the cell of the invention will be stable when used in the cell, under normal and selected abnormal conditions. Therefore, material selection can depend in part on the materials used in the electrodes and electrolyte, chemical reactions that may occur within the cell and environmental and electrical conditions that the cell is intended to withstand. In general, the types of materials used for similar components in conventional cells will be suitable for use in cells according to the invention.

For cells of the present invention the cover and the can will be made of metals that can be formed into the desired shapes and will maintain a suitable cell seal. When the cover and can are made of metals that have sufficient electrical conductivity, they can also serve as current collectors and contact terminals.

For alkaline $Zn/MnO_2$ cells, suitable materials for the cover include steels, such as a nickel plated, cold rolled steel.

For alkaline $Zn/MnO_2$ cells, suitable materials for the container include steels. The exterior surface of the cover and container can be plated, e.g., with nickel, to provide corrosion resistance and an attractive appearance. A portion of the interior surface of the container may be plated with nickel and cobalt and coated with an electrically conductive coating containing, e.g., graphite. Examples of such coatings are disclosed in U.S. Pat. No. 6,342,317, issued Jan. 29, 2002, which is hereby incorporated by reference. Another example of a graphite-containing coating is LB1090, from Timcal America, Westlake, Ohio, USA.

Nickel plated steel is also used to make covers and containers for nonaqueous cells such as $Li/FeS_2$ and $Li/MnO_2$ cells.

In general, the greater the material thickness, hardness and yield strength of the can and cover, the higher the cell crimp release pressure will be.

Gaskets for $Zn/MnO_2$ cells can be made from thermoplastic materials such as nylon, polypropylene, polysulfone and a blend of styrenic polymer with an impact modifier. Another suitable thermoplastic material is a mixture of a polyolefin and an aromatic polymer having a repeating unit with at least one aromatic functional group, NORYL® EXTEND™ PPX7110 and PPX7125, from GE Plastics, Pittsfield, Mass., USA, as disclosed in pending U.S. patent application Ser. No. 10/033,830, filed on Dec. 20, 2001, which is hereby incorporated by reference. NORYL® PXO844, a modified poly(phenylene oxide) (PPO) from GE Plastics, Pittsfield, Mass., USA, is also suitable for use in alkaline $Zn/MnO_2$ cells. It has a modulus of about 368,000 pounds per inch$^2$ (about 25,870 kg/cm$^2$) and a 2% strain yield strength of about 7300 pounds per inch$^2$ (about 513 kg/cm$^2$). Gaskets made from it will generally provide a higher crimp release pressure than gaskets made with either nylon or NORYL® EXTEND™. ULTRASON® S polysulfone grade 2010 from BASF Corporation, Mt. Olive, N.J., USA, has a modulus of about 375,000 pounds per inch$^2$ (about 26,365 kg/cm$^2$) and a 2% strain yield strength of about 7,500 pounds per inch$^2$ (527 kg/cm$^2$), and gaskets made from it will provide an even higher crimp release pressure. In general, the higher the modulus and the strain to failure, the higher the cell crimp release pressure will be.

As alternative to a separate gasket component, a nonconductive coating applied to the sealing surface of one or both of the can torus and the cover flange may serve as a gasket. Suitable materials are disclosed in International Patent Publication Number WO 99/34,457, published on Jul. 8, 1999, and International Patent Publication Number WO 02/43, 165, published on May 30, 2002, both of which are hereby incorporated by reference.

Gaskets for $Li/FeS_2$, $Li/MnO_2$ and other types of nonaqueous cells can be made from thermoplastic materials such as polypropylene.

A sealant may also be added at the sealing interface of one or both of the cover and can. Suitable sealants for alkaline cells include asphalt and asphalt-based materials. Suitable sealants for Li/FeS$_2$ and other nonaqueous cells include ethylene propylene diene terpolymer.

For cylindrical cells it is desirable for the torus above the neck to be both circular in shape and concentric with the can body below the shoulder. The more oval the torus is, the lower the cell crimp release pressure will be. If the radial center of the torus deviates too much from the longitudinal axis of the cell below the can shoulder, the maximum diameter of the finished battery may be exceed industry standards.

Embodiments of the invention have one or more of the following advantages over electrochemical battery cells of the prior art:

- higher electrodes due to close proximity of the can neck and gasket to the top of cell;
- reduced seal height because the seal is on the outside of the can and covers very little of the can's inner surface;
- low volume of inert components and high volume of active materials and electrolyte;
- increased contact surface area between container and electrode and interfacial surface area between electrodes;
- large sealing interface area with a long leakage path;
- external parts of can/gasket and cover/gasket interfaces are farther away from the edge of the jacket, delaying the appearance on the exterior of the battery of any leakage that may occur;
- no external seal required around the negative electrode current collector when the current collector does not extend through an aperture in the cover;
- minimum seal or gasket surface area exposed to electrolyte on inside and air on outside, reducing rates of transmission of undesirable gases through the seal or gasket;
- reduced exposed can surface above the electrodes, reducing the risk of internal short circuits;
- ease of separator management to prevent internal short circuits;
- reduced risk of external short circuits between the can and the negative contact terminal due to jacket damage when cells are dropped or inserted into devices;
- crimp release pressure can be increase by increasing the thickness of the cover rather than the can, with minimal adverse impact on internal volume;
- fewer components required for closing and sealing the cell;
- the components for closing and sealing the cell are relatively simple in design and easily formed;
- incorporation of adhesive seals is facilitated by providing a large can-cover seal interface and minimizing shear with the lock-on feature of the cover;
- little or no axial loading on the main body of the container side wall during closing and sealing, making the use of other materials possible;
- the shape of top of container and cover flange increase their strengths, providing an improved seal or an adequate seal with alternative, lower strength materials;
- readily adapted to conventional manufacturing equipment, uses common types of tooling and cell closing and sealing methods;
- seal quality is not affected by cathode, anode or electrolyte materials on the top inside surface of the can; and
- the diameter at the top of cell is no larger than that of the can body.

EXAMPLE

Housings for LR6 cylindrical alkaline zinc/manganese dioxide cell housings were made according to the invention, with a design similar to that shown in FIG. 2.

Cans were made from 0.008 inch (0.20 mm) thick cold rolled steel strip. The steel strip was an aluminum-killed, low carbon steel strip (carbon content of about 0.04%) and a grain size of ASTM 8 to 12. The strip was plated with nickel on one (the can exterior) surface and with nickel and cobalt on the other (the can interior surface), and was then diffusion annealed. The cans were manufactured on a U.S. Baird multiple transfer press. During can forming the steel was drawn to thin the body of the can side wall to 0.006 inch (0.15 mm), while maintaining a thickness of 0.008 inch (0.20 mm) in the can bottom and in the upper part of the side wall. The cans had pressure relief vents formed in the bottoms, as disclosed in co-pending U.S. patent application Ser. No. 10/365,197. A stamping die incorporating replaceable carbide inserts was used to fabricate the vents. The pressure relief vents were designed to provide a nominal cell vent pressure of about 850 pounds/inch$^2$ (59.8 kg/cm$^2$). During can manufacturing the cans were also folded over at the top such that fold length was about 0.027 inch (0.69 mm). The cans had a nominal outside diameter, in the area below where the shoulder would be, of 0.546 inch (13.9 mm). The outside diameter at the fold was about 0.585 inch (14.9 mm) at the widest point. The cans had a step near the top, with an inside diameter above the step of 0.008 (0.20 mm) inch larger than the inside diameter below the step.

After can forming the cans were necked inward in a two-step process without substantially thinning the steel. In the first step the top portion of the can was reduced in diameter. In the second step an inward projecting bead was formed just below the folded portion of the can such that the minimum outside diameter of the bead was about 0.458 inch (11.6 mm), and a 60 degree fold angle was formed. The final torus diameter was about 0.505 inch (12.8 mm), or about 0.002 inch (0.05 mm) smaller than the maximum outside diameter of the folded portion of the can after crimping in the first step.

Covers were made from half-hard 0.014 inch (0.36 mm) thick cold rolled steel, plated on both sides with nickel. Typical properties of the steel included: Rockwell 15T hardness 84.3, yield strength 62,876 pounds per inch$^2$ (4,421 kg/cm$^2$), ultimate strength 63,618 pounds per inch$^2$ (4,473 kg/cm$^2$), and elongation 12.2 percent. The peripheral flange of the cover was bent downward about 0.067 inch (1.70 mm), with a radius of about 0.030 inch (0.76 mm) at the bend. The maximum outside diameter of the bent flange was about 0.554 inch (14.1 mm).

Anode current collectors, made of C360 brass and having a diameter of about 0.0455 inch (1.16 mm) below the head, were welded to the center of the inside surface of the covers.

Gaskets were injection molded from NORYL® PXO 844. The thickness of the gasket rim was about 0.008 inch (0.20 mm). The gasket had a central aperture about 0.040 inch (1.02 mm) in diameter and a hub, about 0.040 inch (1.02 mm) thick, around the aperture for forming an interference fit around the top of the anode current collector.

Gaskets were mated with covers, with the anode current collectors extending through the aperture in the gasket, and the mated parts were placed onto the tops of the cans.

The cells were sealed using a single step colleting process. The maximum cover diameter after collating was about 0.538 inch (13.7 mm).

Testing was done to determine the crimp release pressure of the housings that were made. The average crimp release pressure was about 1220 pounds per inch$^2$ (85.8 kg/cm$^2$), compared with the nominal cell vent pressure of about 850 pounds/inch$^2$ (59.8 kg/cm$^2$).

The internal volume available for electrodes and electrolyte was calculated to be about 8.3 percent greater than a corresponding conventional cell like that shown in FIG. 1. About 3.2 percent of this increase resulted from a reduction in the can wall thickness (from 0.010 inch (0.25 mm)), and the remaining 5.1 percent due to a reduction in the volume of the components required to seal the cell and provide a suitable pressure relief vent.

Although the present invention has been described in considerable detail with reference to certain preferred versions thereof, other versions are possible. Therefore, the spirit and scope of the appended claims should not be limited to the description of the embodiments contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise, each feature disclosed is one example only of a generic series of equivalent or similar features.

The claimed invention is:

1. An electrochemical battery cell comprising:
   a metal container comprising a closed bottom, a vertical side wall, and an initially open top, the open top having a terminal edge;
   a positive electrode, a negative electrode, a separator, and an electrolyte disposed within the container;
   a positive electrode current collector;
   a negative electrode current collector; and
   a metal cover, having a peripheral flange with a terminal edge, disposed across the open top of the container for sealing the electrodes, separator, and electrolyte within the cell;
   wherein:
   the metal container is electrochemically nonactive with the electrodes and electrolyte;
   one of the positive and negative electrodes is in direct contact with an inner surface of the side wall such that the side wall is at least a part of the current collector of the electrode with which it is in direct contact;
   the side wall is shaped inward below an uppermost part of the container to form a neck, such that a neck outer surface width is smaller than a container outer surface width above the neck;
   the cover flange is shaped around the outside of the side wall above the neck to form a sealing interface between the cover flange end the side wall above the neck without the cover flange being disposed between adjacent layers of the can side wall;
   the terminal edge of the cover flange has a width that is smaller than a width of the side wall above the neck; and
   the terminal edge of the container is shaped radially outward and downward.

2. The cell defined in claim 1, wherein the open top of the container comprises two side-by-side layers of the container side wall.

3. The cell defined in claim 1, wherein the container comprises steel.

4. An electrochemical battery cell comprising:
   a metal container comprising a closed bottom, a vertical side wall, and an initially open top, the open top having a terminal edge;
   a positive electrode, a negative electrode, a separator, and an electrolyte disposed within the container;
   a positive electrode current collector;
   a negative electrode current collector; and
   a metal cover, baying a peripheral flange with a terminal edge, disposed across the open top of the container for sealing the electrodes, separator, and electrolyte within the cell;
   wherein:
   the metal container is electrochemically nonactive with the electrodes and electrolyte; one of the positive and negative electrodes is in direct contact with an inner surface of the side wall such that the side wail is at least a part of the current collector of the electrode with which it is in direct contact;
   the side wall is shaped inward below an uppermost part of the container to form a neck, such that a neck outer surface width is smaller than a container outer surface width above the neck;
   the cover flange is shaped around the outside of the side wall above the neck to form a sealing interface between the cover flange and the side wall above the neck without the cover flange being disposed between adjacent layers of the can side wall;
   the terminal edge of the cover flange has a width that is smaller than a width of the side wall above the neck; and
   the terminal edge of the container is shaped radially inward and downward.

5. The cell defined in claim 4, wherein a compressed material is disposed in the sealing interface between the cover flange and the container.

6. The cell defined in claim 5, wherein a sealant is disposed on a sealing interface surface of at least one of the cover flange and the container.

7. The cell defined in claim 4, wherein a nonconductive material is coated on a sealing interface of at least one of the cover and the container.

8. The cell defined in claim 4, wherein the cell has a contact terminal disposed over the cover.

9. The cell defined in claim 8, wherein one of the positive and negative electrode current collectors extends through an aperture in the cover, and the one current collector is in electrical contact with the contact terminal, and the one current collector is electrically insulated from the cover by a sealing member that forms a seal between the cover and the one current collector.

10. The cell defined in claim 4, wherein the cover flange and the container side wall above the neck comprise an innermost seal for retaining the electrodes and electrolyte within the cell.

11. The cell defined in claim 4, wherein a sealing engagement of the cover flange and the container side wall above the neck is capable of containing the electrodes and electrolyte within the cell during normal storage and use of the cell without a cell jacket.

12. The cell defined in claim 4, wherein the cell is cylindrical and has an outside diameter above the neck that is not substantially greater than a cell outside diameter below the neck.

13. The cell defined in claim 4, wherein the outside diameter above the neck is no greater than the outside diameter below the neck.

14. The cell defined in claim 4, wherein the open tap of the container comprises two side-by-side layers of the container side wall.

15. The cell defined in claim 4, wherein the container comprises steel.

16. An electrochemical battery cell comprising:
   a metal container comprising a closed bottom, a vertical side wall, end an initially open top, the open top having a terminal edge;
   a positive electrode, a negative electrode, a separator, and an electrolyte disposed within the container;
   a positive electrode current collector;
   a negative electrode current collector; and
   a metal cover, having a peripheral flange with a terminal edge, disposed across the open top of the container for scaling the electrodes, separator, and electrolyte within the cell;
wherein:
   the metal container is electrochemically nonactive with the electrodes and electrolyte;
   one of the positive and negative electrodes is in direct contact with an inner surface of the side wall such that the side wall is at least a part of the current collector of the electrode with which it is in direct contact;
   the side wall is shaped inward below an uppermost part of the container to form a neck, such that a neck outer surface width is smaller than a container outer surface width above the neck;
   the cover flange is shaped around the outside of the side wall above the neck to form a scaling interface between the cover flange and the side wall above the neck without the cover flange being disposed between adjacent layers of the can side wall;
   the terminal edge of the cover flange has a width that is smaller than a width of the side wall above the neck;
   the terminal edge of the container is shaped radially inward and downward; and
   the positive electrode is in direct contact with an inner surface of the container side wall.

17. The cell defined in claim 16, wherein the negative electrode is disposed within a cavity in the positive electrode.

18. The cell defined in claim 16, wherein the electrodes and separator have a spirally wound configuration.

19. The cell defined in claim 16, wherein the cell has a cylindrical cross-section perpendicular to a cell longitudinal axis.

20. The cell defined in claim 16, wherein the cell further comprises a jacket covering an outer surface of the container side wall.

21. The cell defined in claim 16, wherein the container is a can with an integral closed bottom.

22. The cell defined in claim 16, wherein the container comprises steel.

23. The cell defined in claim 16, wherein the cell is a primary cell, the positive electrode comprises manganese dioxide, the negative electrode comprises zinc, and the eletrolyte comprises an aqueous solution of potassium hydroxide.

24. An electrochemical battery cell comprising:
   a metal container comprising a closed bottom, an upstanding side wall, and an initially open top, the open top having a terminal edge;
   a positive electrode, a negative electrode, a separator, and an electrolyte disposed within the container;
   a positive electrode current collector;
   a negative electrode current collector; and
   a metal cover, having a peripheral flange with a terminal edge, disposed across the open top of the container for sealing the electrodes separator, and electrolyte within the cell;
wherein:
   the cell has a cylindrical radial crass section;
   a maximum container width is less than a maximum cell height;
   the positive electrode comprises manganese dioxide, the negative electrode comprises zinc and the electrolyte comprises a aqueous alkaline solution;
   the container is electrically conductive and electrochemically nonactive;
   the positive electrode is in direct contact with an inner surface of the side wall such that the side wall is at least a part of the positive electrode current collector;
   the negative electrode is disposed within a cavity in the positive electrode;
   the side wall is shaped inward below an uppermost part of the container to form a neck, such that a neck outer surface width is smaller than a container outer surface width above the neck;
   the cover flange is shaped around the outside of the side wall above the neck to form a sealing interface between the cover flange and the side wall above the neck without the cover flange being disposed between adjacent layers of the can side wall;
   the terminal edge of the cover flange has a width that is smaller than a width of the side wall above the neck; and
   the terminal edge of the container is shaped radially inward and downward.

25. The cell defined in claim 24, wherein the container is a metal can with an integral closed bottom.

26. The cell defined in claim 24, wherein the closed bottom of the container comprises a pressure relief vent.

27. The cell defined in claim 24, wherein the cover comprises a pressure relief vent.

28. The cell defined in claim 24, wherein the cell comprises a positive contact terminal disposed over the closed container bottom.

29. The cell defined in claim 24, wherein the cell comprises a negative contact terminal disposed over the cover.

30. The cell defined in claim 29, wherein the cell comprises a negative electrode current collector extending through an aperture in the cover to electrically contact the negative contact terminal.

31. The cell defined in claim 24, wherein the cell comprises a jacket surrounding the container side wall, and a sealing engagement of the cover flange and the container side wall above the neck is capable of containing the electrodes and electrolyte within the cell during normal storage and use of the cell if the jacket as omitted.

32. The cell defined in claim 24, wherein a compressed material is disposed in the sealing interface between the cover flange and the container.

33. The cell defined in claim 24, wherein a nonconductive material is coated on a sealing interface of at least one of the cover and the container.

* * * * *